United States Patent [19]

Satoh et al.

[11] 4,316,590
[45] Feb. 23, 1982

[54] TAPE CASSETTE

[75] Inventors: Ken Satoh, Akikawa; Sinichi Saitou, Hachioji; Toshikazu Kato, Hochioji; Seizo Watanabe, Hachioji; Toyoo Nishiyama, Musashimurayama; Misao Shimoda, Hamura; Tutomu Shibata, Hachioji; Kenji Kimura, Tachikawa, all of Japan

[73] Assignee: Olympus Optical Co., Ltd., Tokyo, Japan

[21] Appl. No.: 133,816

[22] Filed: Mar. 25, 1980

[30] Foreign Application Priority Data

Apr. 2, 1979 [JP] Japan .................................. 54-39515

[51] Int. Cl.³ ........................ G03B 1/04; G11B 15/32
[52] U.S. Cl. .................................... 242/199; 226/61; 226/190
[58] Field of Search ................ 242/55.19 A, 197–200; 226/190, 191, 60, 61; 360/96, 132

[56] References Cited

U.S. PATENT DOCUMENTS

| 2,273,024 | 2/1942 | De Vry et al. ........................ 226/61 |
| 2,277,019 | 3/1942 | Griffin .................................... 226/60 |
| 2,996,948 | 8/1961 | Beachell .......................... 226/60 X |
| 3,342,950 | 9/1967 | Schwartz et al. ............... 226/188 X |
| 3,685,754 | 8/1972 | Cousino ........................ 242/55.19 A |
| 4,139,168 | 2/1979 | Alberding . |
| 4,205,809 | 6/1980 | Lau ...................................... 242/199 |

FOREIGN PATENT DOCUMENTS 2155186 5/1973 Fed. Rep. of Germany .

*Primary Examiner*—Leonard D. Christian
*Attorney, Agent, or Firm*—Frishauf, Holtz, Goodman and Woodward

[57] ABSTRACT

A tape cassette comprises an impedance roller which is set on the opposite side of a magnetic tape to a magnetic head closely upstream thereof as viewed from the direction in which the magnetic tape runs. The impedance roller presses the magnetic tape toward the magnetic head, thereby preventing the magnetic tape from being shaken.

7 Claims, 6 Drawing Figures

TAPE CASSETTE

BACKGROUND OF THE INVENTION

This invention relates to a tape cassette used with a magnetic recording-reproduction apparatus such as a cassette tape recorder or video tape recorder.

When a tape cassette is loaded in a tape recorder, a magnetic tape received in the tape cassette is generally clamped between the capstan shaft and pinch roller of a magnetic recording-reproduction apparatus. When the capstan shaft is rotated by the motive power of a motor, the magnetic tape is caused to run at a prescribed speed. In this case, full care is taken to stabilize the peripheral speed of the capstan shaft. However, so-called squealings arise in those parts such as tape guides and magnetic heads which contact a magnetic tape, giving rise to shaking of the magnetic tape which in turn leads to irregular running of the tape and eventually produces undesirable flutter and wow.

Already known is an open reel type tape recorder which is provided with an impedance roller to suppress the above-mentioned tape shaking. With the conventional open reel type tape recorder, the impedance roller is set on the same side of a magnetic tape as the magnetic head. The impedance roller is combined with a tension arm or compliance arm which is provided with a tape guide, thereby absorbing the shaking of a magnetic tape to suppress the occurrence of wow and flutter. The known open reel type tape recorder makes it possible to provide a fully sufficient fitting space to easily mount the impedance roller with the tension arm or compliance arm.

However, a tape cassette is small in size, failing to provide a sufficient fitting space. To date, therefore, no tape cassette has been known which contains an impedance roller.

SUMMARY OF THE INVENTION

It is accordingly an object of this invention to provide a tape cassette which suppresses the shaking of a magnetic tape to substantially eliminate the occurrence of wow and flutter. To this end, the present invention provides a tape cassette containing an impedance roller. This impedance roller is disposed on the opposite side of a magnetic tape to a magnetic head and closely upstream thereof as viewed from the direction in which the magnetic tape runs.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Figure 1:
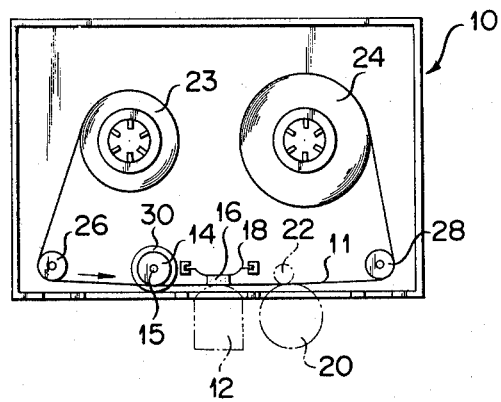
FIG. 1 is a schematic top plan view of a tape cassette according to one embodiment of this invention, with one cassette half taken off.
Figure 2:
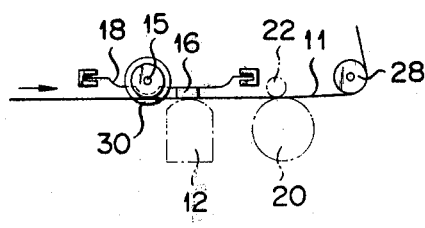
FIG. 2 is a schematic partial top plan view of a tape cassette according to another embodiment of the invention.
Figure 3:
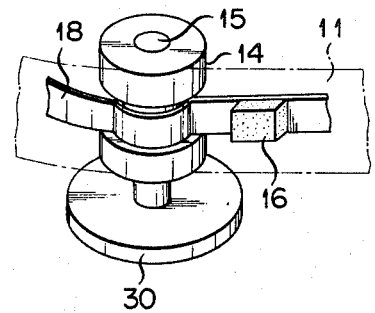
FIG. 3 is an enlarged perspective view of an impedance roller mounted in the tape cassette of FIG. 2.

The preferred embodiments are now detailed with reference the accompanying drawing. As seen from FIG. 1, a tape cassette 10 according to one embodiment of this invention comprises an impedance roller 14 which is disposed near a magnetic head 12 on the upstream side thereof as viewed from the direction in which a magnetic tape 11 runs. The impedance roller 14 is positioned on the opposite side of the magnetic tape 11 to the magnetic head 12, that is, on the upper side of the magnetic tape 11 as indicated in FIG. 1, whereas the magnetic head 12 is set on the lower side of the magnetic tape 11. The impedance roller 14 presses the magnetic tape 11 toward the magnetic head 12. Obviously, the impedance roller 14 can freely rotate about a rotation shaft 15. The tape cassette 10 further comprises a pad spring 18 provided with a pressure pad 16, the pad spring 18 being set to face the magnetic head 12. The magnetic tape 11 received in the tape cassette 10 is clamped between a pinch roller 20 and capstan shaft 22 and is caused to run when the capstan shaft 22 is rotated by the motive power of a motor (not shown). Obviously, the magnetic head 12, pinch roller 20 and capstan shaft 22 are placed in a magnetic recording-reproduction apparatus, into which the tape cassette 10 is inserted. The magnetic tape 11 passes between a supply reel hub 23 and takeup reel hub 24, while being guided by a pair of guide rollers 26, 28. A tape cassette according to one embodiment of this invention is not provided at all with any tape guide member such as a guide pin which is mainly responsible for the occurrence of tape shaking. Therefore, the tape cassette of the present invention is completely saved from tape shaking resulting from a tape guide member such as a guide pin. As previously described, the impedance roller 14 is set near the magnetic head 12 on the upstream side thereof as viewed from the running direction of the magnetic tape 11. The impedance roller 14 presses the magnetic tape 11 toward the magnetic head 12. In other words, the magnetic tape 11 is pressed from the opposite sides thereof by the impedance roller 14 and magnetic head 12. This arrangement suppresses tape shaking which might otherwise take place by a contact between the magnetic tape 11 and magnetic head 12 alone, thereby substantially eliminating the occurrence of wow and flutter. To avoid tape shaking, care should be taken not to set any other tape-contacting member (for example, a tape guide) than the pressure pad 16 and magnetic head 12 between the impedance roller 14 and capstan shaft 22.

It is obviously preferred to set the impedance roller 14 as near as possible to the magnetic head 12, insofar as the pressure pad 16 does not strike against the impedance roller 14. This requirement can be met by forming, for example, the intermediate part of the impedance roller 14 with a smaller diameter to prevent collision of the impedance roller 14 with the pad spring 18, and forming the upper and lower parts of the impedance roller 14 with a larger diameter to ensure the abutment of the parts against the magnetic tape 11. The impedance roller 14 need not restrictively take the above-mentioned shape, but obviously may be formed in various shapes to attain a desired object relative to the pad spring 18. Further, the impedance roller 14 need not be the type which consists of a smoothly rotatable roller alone, but may be of the type which comprises not only the roller but also a larger diameter impedance wheel 30 fitted to the lower end of the rotation shaft 15.

Figure 4:
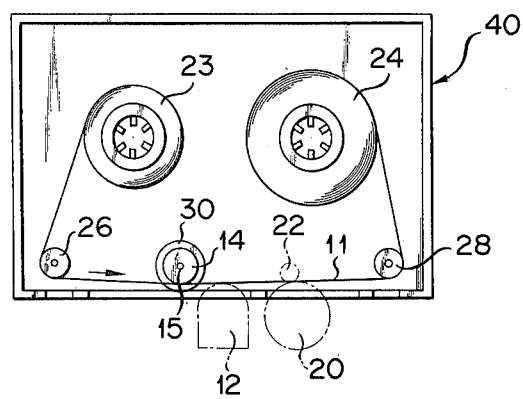
FIGS. 4 and 5 are schematic top plan views of a tape cassette according to a third embodiment of this invention, which are similar to that of FIG. 1.
Figure 5:
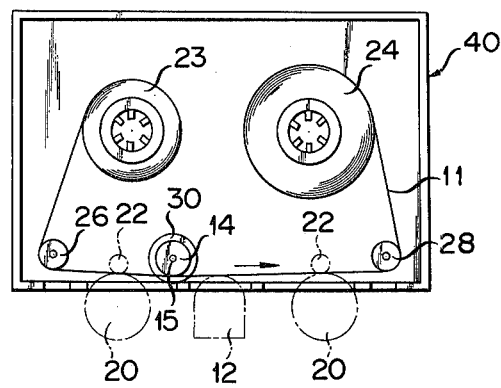
Figure 6:
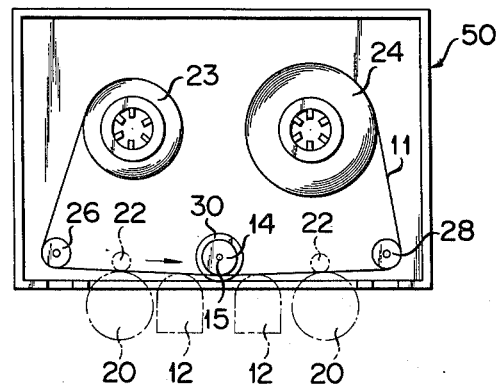
FIG. 6 is a schematic top plan view of a tape cassette according to a fourth embodiment of this invention, which is also similar to that of FIG. 1.

As seen from FIG. 4, it is possible to omit the pad 16. With the tape cassette 40, the impedance roller 14 can be drawn nearer to the magnetic head 12, thereby effectively suppressing the shaking of the magnetic tape 11. Further where the tape cassette 40 is fitted, as shown in FIG. 5, to a dual capstan type magnetic recording-reproduction apparatus, then full tension can be applied to the magnetic tape 11, thereby more effectively preventing the shaking of the magnetic tape. Further as indicated in FIG. 6 representing another embodiment, the impedance roller 14 may be set just midway between the guide rollers 26, 28. A tape cassette 50 according to the embodiment of FIG. 6 is adapted to be loaded in a dual capstan type magnetic recording-reproduction apparatus provided with a pair of magnetic heads.

As described above, a tape cassette embodying this invention comprises an impedance roller, which is set on the opposite side of the magnetic tape 11 to the magnetic head 12 closely upstream thereof as viewed from the direction in which the magnetic tape 11 runs. As a result, the magnetic tape 11 is pressed from the opposite sides thereof by the adjacent impedance roller 14 and magnetic head 12, thereby preventing the magnetic tape 11 from being shaken and substantially suppressing the occurrence of wow and flutter.

What we claim is:

1. In a tape cassette comprising a housing, a supply reel hub, a take-up reel hub, a length of magnetic tape which is supplied from said supply reel hub to said take-up reel hub, and a pair of guide rollers located at opposite end portions of said housing and around which said magnetic tape passes from said supply reel hub to said take-up reel hub, a portion of said housing intermediate said guide rollers being provided with an opening through which a magnetic head is placed in contact with one side of said magnetic tape; the improvement comprising in accordance with the invention:

a rotatable impedance roller mounted to said housing intermediate one of said guide rollers and said opening for receiving a magnetic head, and located to contact the side of said magnetic tape opposite the side which contacts a magnetic head, said guide rollers and impedance roller all contacting the same side of said magnetic tape, said impedance roller being mounted closely upstream of said opening for receiving a magnetic head as viewed from the direction in which the magnetic tape runs from said supply reel hub to said take-up reel hub.

2. The tape cassette of claim 1, further comprising a pressure pad located to contact the side of the magnetic tape opposite the side which contacts a magnetic head, and for pressing said tape against said magnetic head, and a capstan opening for receiving a capstan shaft for driving said tape in the running direction thereof, the improvement wherein only said pressure pad is disposed between said impedance roller and said capstan shaft opening.

3. The tape cassette of claim 2, wherein said pressure pad comprises a pad spring for resiliently biassing said pressure pad toward a magnetic head, said pad spring having at least one end anchored in said housing, and wherein said impedance roller comprises an annular groove for receiving said end portion of said pad spring, to prevent interference between said pad spring and said impedance roller.

4. The tape cassette of claim 3, wherein said annular groove is formed in the central part of said impedance roller.

5. The tape cassette of claim 1 or 4, wherein said impedance roller further comprises a shaft, and an impedance wheel fitted to said shaft.

6. The tape cassette of claim 5 wherein said impedance wheel has a larger diameter than said impedance roller, said impedance wheel and roller being mounted to opposite ends of the shaft of said impedance roller.

7. The tape cassette of claim 1, wherein said impedance roller is mounted to bias said magnetic tape toward a magnetic head so as to press said tape against said magnetic head, thereby eliminating the need for a pressure pad.

* * * * *